Oct. 26, 1926.
J. R. ANDERSON
WRIST EXERCISER
Filed April 18, 1925
1,604,333
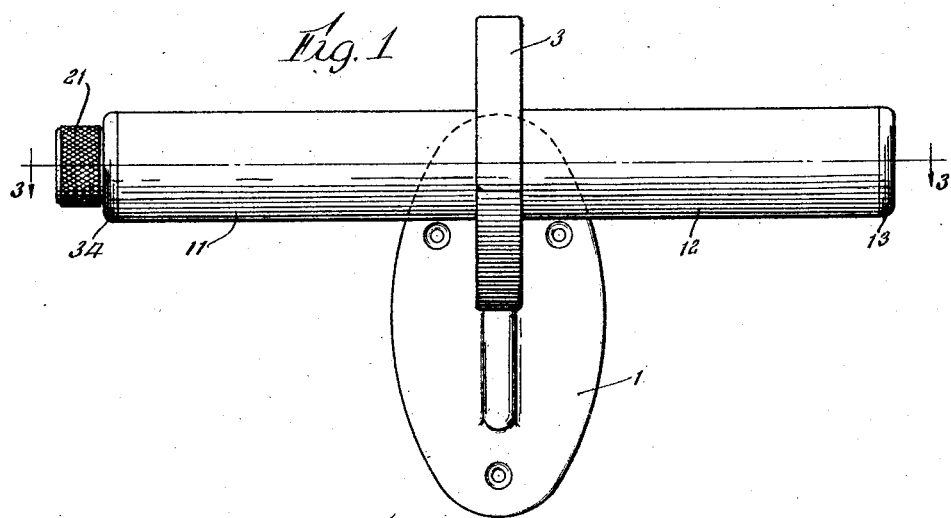
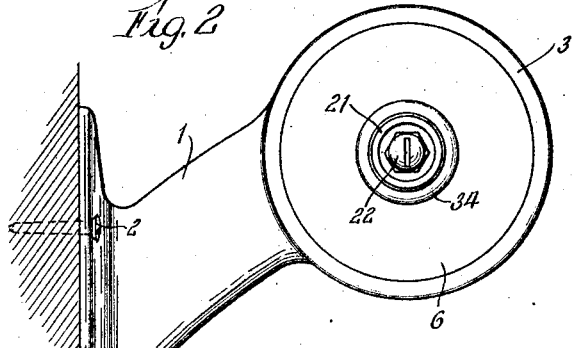
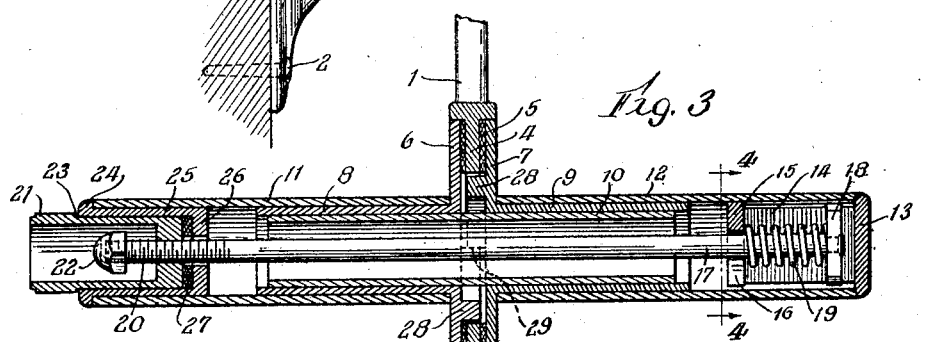
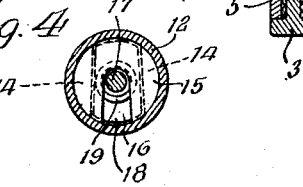
Inventor:
John R. Anderson
By: Wm O Belt
Atty.

Patented Oct. 26, 1926.

1,604,333

UNITED STATES PATENT OFFICE.

JOHN R. ANDERSON, OF MOLINE, ILLINOIS.

WRIST EXERCISER.

Application filed April 18, 1925. Serial No. 24,040.

This invention relates to a novel and improved exerciser particularly adapted for wrist exercises. In many sports, particularly tennis and golf, a strong wrist is greatly to be desired and the object of my invention is to provide an exerciser which may be cheaply made in a form to be attached to a suitable support, such as a wall, which will provide the proper motion for exercise of the wrist and which may be readily adjusted to provide varying amounts of resistance to be overcome.

My invention comprises essentially a frame, which may be in a form of a bracket to be attached to the wall of a room, for example, and the end of the frame is provided with a clutch face adapted to co-act with clutch faces on hand grips mounted on either side of the frame. The clutch faces may be adjusted by a single stem disposed inside the grips and provided with a nut threaded on one end.

In the accompanying drawings in which I have shown a selected embodiment of my invention:

Fig. 1 is a front elevation of my exerciser.

Fig. 2 is an end elevation thereof.

Fig. 3 is a section on the line 3—3 of Fig. 1.

Fig. 4 is a section on the line 4—4 of Fig. 3.

Referring now to the drawings, the numeral 1 designates a frame which I have shown in the form of a bracket adapted to be secured to a support by screws 2. The outer end of the frame is circular in form and is provided with a peripheral flange 3 extending in both directions from the centrally apertured disk 4. Each face of this disk forms a clutch face and mounted within the flange 3 on either side of the disk I provide friction washers 5 and engaging these washers on the outer faces thereof are clutch faces on disks 6 and 7, each provided with tubular stems 8 and 9 respectively. As plainly shown in Fig. 3, the stems 8 and 9 will be disposed in substantial alignment with each other when the clutch faces on the disks 6 and 7 are in contact with the washers 5, and when in this position the parts are held in alignment by means of an alignment tube 10 disposed within the tubular stems 8 and 9 and fitting snugly therein.

Secured rigidly on the tubular stems 8 and 9 are the hand grips 11 and 12. The end of the grip 12 is closed by the cap 13 having the inwardly extending sleeve 14 terminating in the wall 15, which is slotted at 16 to permit passage therethrough of the threaded stem 17. On the end of this stem is secured the head 18 between which and the wall is disposed a compression spring 19. The stem 17 extends through the alignment tube 10 and terminates in a threaded portion 20 adjacent the end of the grip 11. Threaded on this portion is a nut 21, which I have shown as hollow so as to accommodate the stop nut 22, which limits the outward movement of the nut 21. The nut 21 is provided with an annular shoulder 23 contacting with the flange 24 of the cap 25, which is disposed within the grip 11, as plainly shown in Fig. 3 and terminates in a wall 26 having a central aperture therein for the passage of the stem 17. Disposed between the nut 21 and the wall 26 is a suitable washer 27.

In operation the exerciser is mounted on a suitable support, such as a wall and then the two hand grips are grasped by the hands and rotated against the friction caused by the clutch, which comprises the disks 4, 6 and 7 and the friction washers 5 therebetween. The resistance caused by this clutch may be varied by rotation of the nut 21. Tightening of this nut will cause the caps 13 and 24 to bear with increased pressure against the ends of the grips 11 and 12 and this pressure is in turn transmitted to the disks 6 and 7. If desired, the grips may be made so as to rotate independently of each other, but I prefer to have them rotatable in unison and to that end I provide a split ring 28 half of which is on each of the disks 6 and 7. When the parts are assembled, the ends of these half rings abut each other, as at 29 (Fig. 3) and thus prevent relative rotation between the grips.

From the above it will be seen that I have provided a wrist exerciser of extremely simple character, but which is nevertheless efficient and can be adjusted to give any amount of resistance desired. The machine is compact, has a minimum number of parts, can be readily transported from place to place and secured to any suitable support, after which it is ready for use.

I am aware that changes in the form, construction and arrangement of parts may be made without departing from the spirit and without sacrificing the advantages of the invention and I reserve the right to make all such changes as fairly fall within the scope of the following claims.

I claim:

1. A wrist exerciser comprising a pair of oppositely disposed rotatable grips, clutch faces on the adjacent ends of said grips, fixed resistance member interposed between said clutch faces to permit the grips to be used independently or conjointly, and means for holding said clutch faces in operative engagement with said member.

2. A wrist exerciser comprising a pair of oppositely disposed rotatable grips, clutch faces on the adjacent ends of said grips, a fixed resistance member interposed between said clutch faces to permit the grips to be used independently or conjointly, and yielding means for holding said clutch faces in operative engagement with said member.

3. A wrist exerciser comprising a pair of oppositely disposed rotatable grips, clutch faces on the adjacent ends of said grips, a fixed resistance member interposed between said clutch faces to permit the grips to be used independently or conjointly, and yielding means within said grips for holding said clutch faces in operative engagement with said member.

4. A wrist exerciser comprising a stationary frame, a disk on said frame and comprising clutch faces on either side thereof, grips on opposite sides of said disk and provided with disks having clutch faces co-acting with said first named clutch faces, and means for adjusting said grips in respect to said frame to vary the pressure on said clutch faces.

5. A wrist exerciser comprising a frame, a disk on said frame, and having a central aperture, tubular grips having disks co-acting with either side of said first named disk, caps closing the ends of said grips, a stem passing through said grips and connecting said caps, and means for adjusting the pressure of said caps on the ends of said grips, for the purpose set forth.

6. A wrist exerciser comprising a frame having an apertured disk, tubular grips on either side of said disk and having disks thereon co-acting with said first named disk to form a clutch, an alignment tube within said grips, caps bearing against the ends of said grips, and means extending through said grips and said alignment tube resiliently connecting said caps.

7. A wrist exerciser comprising a frame having an apertured disk, tubular grips on either side of said disk and having disks thereon co-acting with said first named disk to form a clutch, an alignment tube within said grips, caps bearing against the ends of said grips, means extending through said grips and said alignment tube resiliently connecting said caps, and means for adjusting said connecting means to vary the pressure of said caps against the ends of said grips.

JOHN R. ANDERSON.